United States Patent [19]

Plischke

[11] Patent Number: 4,501,882

[45] Date of Patent: Feb. 26, 1985

[54] BATCH PROCESS FOR PREPARING 6TA/6IA COPOLYMERS HIGH IN 6TA

[75] Inventor: LeMoyne W. Plischke, Lillian, Ala.

[73] Assignee: Monsanto Company, St. Louis, Mo.

[21] Appl. No.: 552,531

[22] Filed: Nov. 16, 1983

[51] Int. Cl.³ .......................................... C08G 69/28
[52] U.S. Cl. .................................... 528/336; 526/74; 528/339; 528/347
[58] Field of Search ............... 528/336, 335, 347, 339; 526/74

[56] References Cited

U.S. PATENT DOCUMENTS 3,941,755  3/1976  Chapman et al. ............... 260/78 R
4,246,395  1/1981  Mortimer ............................ 528/208

*Primary Examiner*—Harold D. Anderson
*Attorney, Agent, or Firm*—John W. Whisler

[57] ABSTRACT

In the batch melt polymerization process for preparing 6TA/6IA copolymer having a high 6TA content, i.e., greater than 45%, successive batches of copolymer can be prepared without cleaning out the autoclave between successive batches by conducting the preparation of each batch in the presence of a small amount of a base, for example, sodium hydroxide.

11 Claims, No Drawings

BATCH PROCESS FOR PREPARING 6TA/6IA COPOLYMERS HIGH IN 6TA

BACKGROUND OF THE INVENTION

1. Field of the Invention

This invention relates to an improvement in the batch melt polymerization process for preparing copolyamides consisting essentially of randomly recurring units of the formulas

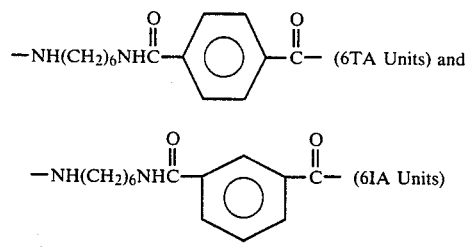

where 45 to 80% of the units are 6TA units. Copolymers consisting essentially of 6TA and 6IA units are referred to herein as 6TA/6IA copolymers.

2. Description of the Prior Art

In the batch melt polymerization process for preparing a 6TA/6IA copolymer, an aqueous solution of an appropriate mixture of hexamethylene diammonium terephthalate (6TA salt) and hexamethylene diammonium isophthalate (6IA salt) is charged to a vessel (e.g. autoclave). The vessel is sealed from the atmosphere. The solution is then heated with stirring or agitation under controlled conditions of time, temperature and pressure to remove water from the vessel, effect polymerization of the salts and provide the 6TA/6IA copolymer in the molten state. Normally the copolymer is then extruded from the bottom of the vessel, diced, stored and subsequently remelted and shaped into fibers or molded articles. A minor amount (10 to 35%) of the polymer remains on the inner surfaces (e.g. walls and agitator) of the vessel and is referred to as the heel. The process is then repeated to prepare successive batches of the copolymer. If the salt mixture contains less than about 40% by weight of the 6TA salt, the entire heel in the vessel from the last batch melts and blends with molten copolymer formed in the next batch to provide homogeneous copolymer having substantially the same properties and appearance as the copolymer prepared in the previous batch. However, if the salt mixture contains more than about 40% by weight of the 6TA salt, the entire heel does not melt in the molten copolymer formed in the next batch but rather a portion of the heel disperses in the copolymer of the next batch in the form of opaque particles of noticeable size to provide a blend of heel and copolymer from which useful fibers and articles can not be shaped. Moreover, a sufficient amount of heel particles accumulate in the vessel after several successive batches, if not after the first batch, to cause plugging of extrusion passages leading from the vessel, thereby making it impossible to extrude the blend of heel and copolymer from the vessel. The only way to effectively remove the heel/copolymer blend from commercial type vessels is by dismantling and then cleaning the heel from the dismantled parts of the vessel. Such a procedure is time consuming and costly and, therefore, not practical or feasible for commercial operations.

U.S. Pat. No. 4,238,603 discloses that the above mentioned heel problem associated with using the batch process to prepare successive batches of 6TA/6IA copolymer high in 6TA content can be overcome by modifying the 6TA/6IA copolymer to provide a terpolymer, for example, the terpolymer formed by polymerizing a mixture of 6TA, 6IA and nylon 66 salts where from 2-15% of the mixture is nylon 66 salt. These terpolymers, however, require an additional monomer, the presence of which alters the properties of the 6TA/6IA copolymers, for example, the melting point, crystallinity and tensile strength thereof.

SUMMARY OF THE INVENTION

It is an object of the present invention to provide an improvement in the above-described batch melt polymerization process for preparing 6TA/6IA copolymers having a 6TA content ranging from 45% to 80% by weight wherein successive batches can be prepared in a vessel without cleaning the vessel between successive batches to remove the heel therefrom.

The above and other objects of the invention are accomplished by preparing each batch in the presence of a base. The base may be an inorganic or organic base. The presence of the base not only makes it possible to prepare batch after batch of the copolymer without cleaning the vessel, but also to produce batch after batch of commercial-grade copolymer having substantially the same physical properties from batch to batch.

PREFERRED EMBODIMENTS OF THE INVENTION

Bases which may be suitably used in practicing the improvement of the present invention include inorganic bases, such as alkali metal and alkaline earth metal hydroxides (e.g., sodium hydroxide, potassium hydroxide, lithium hydroxide, barium hydroxide, calcium hydroxide and magnesium hydroxide), and organic bases, such as quaternary ammonium hydroxides (e.g., tetraethylammonium hydroxide and tetrabutylammonium hydroxide), choline and aminoethylpiperazine. As a practical matter from the standpoint of cost and availability, sodium hydroxide is a preferred base for use in practicing the improvement of the present invention.

The base is employed in an amount sufficient to permit batch after batch of reproducible, commercial grade 6TA/6IA copolymer to be prepared without cleaning the vessel between successive batches to remove the heel. By commercial-grade copolymer is meant copolymer useful in preparing fibers and/or molded articles. When using sodium hydroxide as the base, this amount ranges from 15 to 500 equivalents by weight of sodium hydroxide for each $10^6$ gram of copolymer, calculated based on the amount of 6TA and 6IA salts added to the vessel with amounts ranging from 15 to 100 equivalents of NaOH normally being sufficient. On the other hand, when using aminoethylpiperazine as the base, it was found necessary to add greater amounts thereof to achieve the improvement. The amount of any particular base required to practice the improvement of the invention can be easily determined experimentally, preferably, using a small laboratory-scale autoclave which can be cleaned, if necessary, merely by sufficiently heating the autoclave to burn the heel.

The base is preferably added to the salt solution prior to polymerization, for example, before the salt solution is charged to the vessel or immediately thereafter before the vessel is sealed from the atmosphere. If desired, however, the base may be added to the contents of the vessel at any time during polymerization or to the molten copolymer prior to extrusion.

It has been found that transparent or substantially transparent 6TA/6IA copolymer can be prepared in accordance with the improvement of the present invention by using as the base, an alkali metal hydroxide, with sodium hydroxide providing the most transparent copolymers followed by lithium hydroxide and potassium hydroxide in that order. In general, as the amount of alkali metal hydroxide added is increased the color of the resulting copolymer decreases from a golden color to a more clear transparency or lack of color.

The following examples are given to further illustrate the invention.

EXAMPLE 1

In this example 6TA/6IA copolymer containing 45% 6TA was prepared in a laboratory autoclave in accordance with the improvement of the invention.

To a stirred autoclave were added 67 g of dry 6TA salt and 204.8 g of an aqueous solution of 40.0% 6IA salt. A solution of NaOH was prepared by adding 26 g of 50% NaOH to 100 ml volumetric flask and then diluting with deionized water to the 100 ml mark on the flask. Twenty milliliters of the resulting NaOH solution were added to the contents of the autoclave. This corresponded to adding 500 eq. of NaOH per $10^6$ grams of polymer. After purging air from the autoclave with nitrogen, the contents of the autoclave were heated to 157° C. while maintaining the pressure at 25 psig (0.273 MPa). The pressure was then increased to 350 psig (2.4 MPa) with nitrogen and the slurry heated to a temperature of 242° C. over a period of about 30 minutes. The temperature was then increased to 300° C. over a period of about 65 minutes while maintaining the pressure at 350 psig (2.4 Mpa) by releasing steam from the autoclave. The pressure was then reduced to atmospheric pressure during a period of forty minutes while the temperature was permitted to climb to 325° C. The polymer was extruded from the bottom of the autoclave at 325° C. under a nitrogen pressure of 10 psig. Successive batches of the copolymer were prepared by repeating the above procedure without cleaning the autoclave. The copolymer was transparent. When the above procedure was repeated except that the addition of the NaOH was omitted, the copolymer would not extruded from the autoclave due to the presence of heel particles. Similar results are obtained when the NaOH is replaced with a corresponding amount of LiOH, KOH, tetrabutyl-ammonium hydroxide and tetraethyl-ammonium hydroxide.

In related experiments batches of 6TA/6IA copolymer having a 6TA content of 55% were prepared using the laboratory autoclave and the above procedure. The amount of NaOH added was varied from batch to batch in amounts ranging from 15 equivalents per $10^6$ polymer (9.368 mole %) to 500 equivalents (10.965 mole %). In other batches aminoethylpiperazine was added instead of NaOH in amounts ranging from 2.987 mole % to 10.965 mole %. The autoclave was heated between batches to burn out the heel. A plot was made of the intrinsic viscosity of the copolymer formed in each batch against the amount of NaOH or piperazine added. Also, the extrusion characteristics of the copolymer of each batch were observed. From the plot and observations the optimum amount of NaOH and piperazine to be added to this particular copolymer was determined to be 25 equivalents (0.612 mole %) of NaOH and 7.147 mole % of the piperazine. It was observed that the copolymer prepared using NaOH was transparent and that prepared using the piperazine was golden in color. The results obtained in these experiments were used to select conditions for preparing successive batches of the copolymer in a 250-pound (113-kg) commercial size autoclave.

EXAMPLE 2

In this example successive batches of 6TA/6IA copolymer having a 6TA content of 45% were prepared in accordance with the improvement of the invention in a 250-pound (113-kg) autoclave.

To the autoclave were added 764.3 lbs (346.7 kg) of a 13.5% by weight aqueous solution of 6TA salt and 315.2 lbs (143 kg) of a 40.0% aqueous solution of 6IA. An antifoaming agent (506 cc) and an aqueous solution of NaOH containing 25 eq. of NaOH/$10^6$ grams of copolymer (0.612 mole %) were then added to the autoclave. Air was purged from the autoclave with nitrogen. The contents of the autoclave were pressurized to 350 psig (2.5 MPa). Then, over an 11 minute period (1st cycle) the contents of the autoclave were heated from room temperature to 242° C. while under a nitrogen pressure of 350 psig (2.5 MPa). Then (2nd cycle), the temperature was increased to 300° C. over a period of 108 minutes while maintaining the pressure of 350 psig (2.5 MPa) by bleeding off steam. Then (3rd cycle), the temperature was increased to 325° C. over a period of 40 minutes while the pressure was reduced to atmospheric pressure. Then (4th cycle), the molten polymer is held at atmospheric pressure and 325° C. for a period of 60 minutes, after which time the polymer is extruded in the form of a ribbon from the bottom of the autoclave and diced into granular form. (The 4th cycle is considered optional.) Three successive batches of polymer are made in the same autoclave without cleaning the autoclave between successive batches. The time period for each cycle of each batch is given below:

| BATCH | TIME/CYCLE | | | |
|---|---|---|---|---|
| | 1 | 2 | 3 | 4 |
| 1 | 11 | 108 | 40 | 60 |
| 2 | 11 | 108 | 40 | 60 |
| 3 | 45 | 92 | 40 | 0 |

The polymer from each batch was clear in appearance and had substantially the same physical properties.

In related experiments, 600 lbs (272 kg) of 6TA/6IA copolymer having a 6TA content of 51% was prepared in a 250-lb (113-kg) autoclave using the above general batch polymerization procedure. The resulting copolymer was used in making molded articles having excellent reproducibility from article to article.

I claim:

1. In a process for preparing successive batches of a random copolyamide consisting essentially of the following recurring units

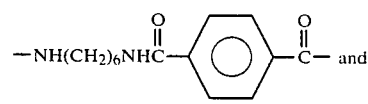

and

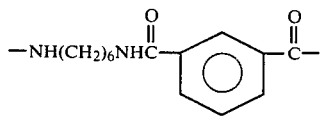

wherein each batch of said copolyamide is prepared by heating an aqueous solution consisting essentially of a mixture of hexamethylene diammonium terephthalate (6TA salt) and hexamethylene isophthalate (6IA salt) in a weight ratio of 6TA salt to 6IA salt ranging from about 45:55 to 80:20 in a vessel closed to the atmosphere wherein said heating is conducted under controlled conditions of time, temperature and pressure to remove water from the vessel, effect polymerization of said salts and provide said copolyamide in the molten state in the vessel and wherein said copolyamide in the molten state is then extruded from the vessel except for a minor amount thereof which remains on the inner surfaces of the vessel, the improvement comprising the additional step of adding a base to said vessel prior to the extrusion of said molten copolyamide, said base being added in an amount sufficient to permit successive batches of said copolyamide to be prepared in said vessel without cleaning the vessel between each successive batch to remove said minor amount of copolyamide therefrom.

2. The improvement of claim 1 wherein said base is an inorganic base.

3. The improvement of claim 1 wherein said base is an organic base.

4. The improvement of claim 1 wherein said base is an alkali metal hydroxide.

5. The improvement of claim 4 wherein said alkali metal is sodium.

6. The improvement of claim 1 wherein said base is a quanternary ammonium hydroxide.

7. The improvement of claim 6 wherein said hydroxide is a tetralkylammonium hydroxide.

8. The improvement of claim 7 wherein said alkyl is ethyl or butyl.

9. The process of claim 1 wherein said base is added to said vessel prior to said heating of the aqueous solution in the vessel.

10. The process of claim 9 wherein said base is an alkali metal hydroxide.

11. The process of claim 9 wherein said base is sodium hydroxide.

* * * * *